United States Patent [19]

Sawabe et al.

[11] Patent Number: 5,960,152
[45] Date of Patent: Sep. 28, 1999

[54] INFORMATION RECORD MEDIUM, APPARATUS FOR RECORDING THE SAME AND APPARATUS FOR REPRODUCING THE SAME

[75] Inventors: Takao Sawabe, Tokyo-to; Tokihiro Takahashi, Tokorozawa; Junichi Yoshio, Tokorozawa; Hidehiro Ishii, Tokorozawa; Hiroshi Nakamura, Tokorozawa; Kaoru Yamamoto; Akihiro Tozaki, both of Tsurugashima, all of Japan

[73] Assignee: Pioneer Electronic Corporation, Tokyo-To, Japan

[21] Appl. No.: 08/815,184

[22] Filed: Mar. 11, 1997

[30] Foreign Application Priority Data

Mar. 15, 1996 [JP] Japan ..................... 8-059835

[51] Int. Cl.⁶ .............. H04N 5/91; H04N 5/928
[52] U.S. Cl. ........................ 386/98; 386/96
[58] Field of Search ............ 386/96, 104, 39, 386/98, 46, 99, 75, 54; H04N 5/91, 5/928

[56] References Cited

U.S. PATENT DOCUMENTS 5,583,652  12/1996  Ware ........................ 386/75
5,812,736   9/1998  Anderson ................... 386/96
5,815,634   9/1998  Daum et al. ................ 386/96

*Primary Examiner*—Robert Chevalier
*Attorney, Agent, or Firm*—Morgan, Lewis & Bockius LLP

[57] ABSTRACT

An information record medium (1: DVD) has a record track (1a) to be reproduced by an information reproducing apparatus (S2). The information reproducing apparatus is provided with a read device (80) and reproduces audio information by a predetermined audio frame unit while relatively moving the read device along the record track recorded with at least the audio information by the audio frame unit. A plurality of audio packets (43, 202) are arranged along the record track, in each of which audio information pieces (207) constructing the audio information sampled by a predetermined sampling frequency and audio control information (203) for controlling a reproduction of the audio information pieces by the information reproducing apparatus are respectively recorded. The audio control information is provided with time management information (203f: PTS) for specifying a time, by a predetermined specification frequency, to manage a timing of outputting the audio information, which is included in the audio frame which head is positioned in the audio packet including the audio control information, in the reproduction by the information reproducing apparatus.

9 Claims, 11 Drawing Sheets

PHYSICAL STRUCTRE OF RECORD INFORMATION
(PHYSICAL FORMAT)

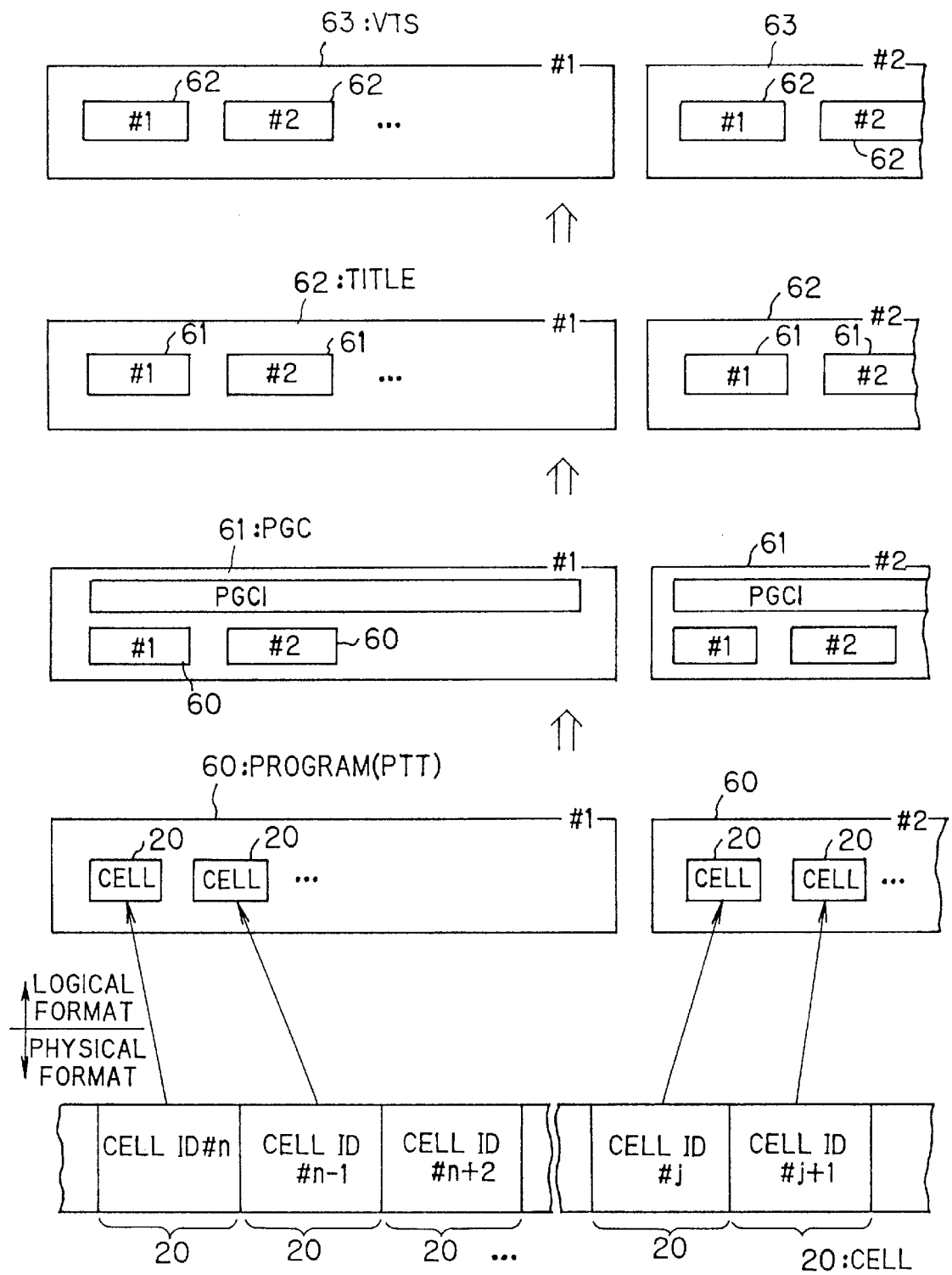

STRUCTURE OF INTERLEAVED UNIT

IU : INTERLEAVED UNIT

SPECIFICATION OF PCM LINEAR AUDIO DATA

| CHANNEL NO. | SAMPLING FREQUENCY [Hz] | NUMBER OF QUANTIZED BITS |
|---|---|---|
| 1 | 48k/96k | 16, 20, 24 |
| 2 | 48k/96k | 16, 20, 24 |
| 3 | 48k/96k | 16, 20 |
|   | 48k | 24 |
| 4 | 48k/96k | 16 |
|   | 48k | 20, 24 |
| 5 | 48k | 16, 20, 24 |
| 6 | 48k | 16, 20 |
| 7 | 48k | 16 |
| 8 | 48k | 16 |

FIG. 9

| SPECIFICATION OF LINEAR AUDIO DATA | | DATA IN THE PACKET | | |
|---|---|---|---|---|
| CHANNEL NO. | SAMPLING FREQUENCY [kHz] | NUMBER OF QUANTIZED BITS [bits] | MAXIMUM NUMBER OF SAMPLES IN ONE PACKET | DATA SIZE [bytes] |
| 1 (MONOPHONIC) | 48/96 | 16 | 1004 | 2008 |
| | 48/96 | 20 | 804 | 2010 |
| | 48/96 | 24 | 670 | 2010 |
| 2 (STEREO) | 48/96 | 16 | 502 | 2008 |
| | 48/96 | 20 | 402 | 2010 |
| | 48/96 | 24 | 334 | 2004 |
| 3 | 48/96 | 16 | 334 | 2004 |
| | 48/96 | 20 | 268 | 2010 |
| | 48 | 24 | 222 | 1998 |
| 4 | 48/96 | 16 | 250 | 2000 |
| | 48 | 20 | 200 | 2000 |
| | 48 | 24 | 166 | 1992 |
| 5 | 48 | 16 | 200 | 2000 |
| | 48 | 20 | 160 | 2000 |
| | 48 | 24 | 134 | 2010 |
| 6 | 48 | 16 | 166 | 1992 |
| | 48 | 20 | 134 | 2010 |
| 7 | 48 | 16 | 142 | 1988 |
| 8 | 48 | 16 | 124 | 1984 |

FIG.10

PACKET HEADER: 203

| | FIELD NAME | NUMBER OF BITS | NUMBER OF BYTES | DATA VALUE | RECITAL |
|---|---|---|---|---|---|
| 203a | PACKET START CODE | 24 | 3 | 000001h | |
| 203b | STREAM ID | 8 | 1 | 10111101b | INDICATE PRIVATE STREAM 1 |
| 203c | PACKET LENGTH | 16 | 2 | | |
| | '10' | 2 | 3 | | |
| | ⋮ | ⋮ | | ⋮ | |
| 203d | PTS AND DTS FLAG | 2 | | 10b or 00b | |
| | ⋮ | ⋮ | | ⋮ | |
| 203e | DATA LENGTH OF HEADER | 8 | | 5 to 15 | |
| 203f | PTS | | 5 | USER DEFINED | PACK FORWARD IN CASE OF NO PTS ADDED |
| | PRIVATE DATA FLAG | 1 | 1 | 0 | |
| | ⋮ | ⋮ | | ⋮ | |
| 203g | '10' | 2 | 2 | | |
| | BUFFER SCALE | 1 | | 0 | |
| 203h | BUFFER SIZE | 13 | | 32 | |
| 203i | STUFFING BYTES | ·· | 1 to 7 | | ADD AS OCCASION DEMANDS |

FIG.11

PRIVATE DATA AREA IN PACKET

| FIELD | NUMBER OF BITS | NUMBER OF BYTES | DATA VALUE | RECITAL |
|---|---|---|---|---|
| SUB STREAM ID | 8 | 1 | 10100xxxb | INDICATE STREAM NO. BY xxx |
| NUMBER OF FRAME BOUNDARIES | 8 | 3 | USER DEFINED | |
| 1st ACCESS UNIT POINTER | 16 | | USER DEFINED | |
| AUDIO EMPHASIS FLAG | 1 | | USER DEFINED | |
| AUDIO MUTE FLAG | 1 | | USER DEFINED | |
| --- | --- | 3 | --- | |
| AUDIO FRAME NO. | 5 | | USER DEFINED | |
| NUMBER OF QUANTIZED BITS | 2 | | USER DEFINED | |
| SAMPLING FREQUENCY | 2 | | USER DEFINED | |
| NUMBER OF CHANNELS | 3 | | USER DEFINED | |
| DYNAMIC RANGE CONTROL | 8 | | USER DEFINED | |
| PCM LINEAR AUDIO DATA | | MAX 2013 | | |

204 — SUB STREAM ID
205 — NUMBER OF FRAME BOUNDARIES, 1st ACCESS UNIT POINTER
206 — AUDIO EMPHASIS FLAG ... DYNAMIC RANGE CONTROL
207 — PCM LINEAR AUDIO DATA

INFORMATION RECORD MEDIUM, APPARATUS FOR RECORDING THE SAME AND APPARATUS FOR REPRODUCING THE SAME

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD, the CD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, there is a problem that, according to the above mentioned CD, LD or the like, a so-called interactive and variegated reproduction is not possible in which the audience can have a plurality of selection branches as for the video or audio information to be displayed or sound-outputted and in which the audience can select them to watch or listen to it.

Namely, for example, in case of giving audience to a foreign movie on the LD, it is not possible to select one of languages to be used for a subtitle (caption) displayed on the picture plane (e.g., select one of the subtitle in Japanese and the subtitle in the original language) so as to display the subtitle in the selected language, or, in case of giving audience to a music recorded on the CD, it is not possible to select one of sound voices of the music (e.g., select one of the English lyric and the Japanese lyric).

On the other hand, various proposals and developments are being made as for the DVD, as an optical disk in which the memory capacity is improved by about ten times without changing the size of the optical disk itself as compared with the aforementioned conventional CD. According to the knowledge of the present inventors, it is anticipated that it is possible, as for the DVD having such a large memory capacity, to: divide audio information, video information or the like by an appropriate length respectively into an audio pack, a video pack or the like; add additional information such as header information to each pack; switch and multiplex these packs; and reproduced the multiplexed audio information, video information or the like.

However, in the field of the audio or video related technique, the audio information, the video information or the like is generally treated in a relatively large unit e.g. a so called audio frame or video frame, at the time of recording, editing and reproducing by the recording apparatus and the reproducing apparatus. Thus, for example, assuming that the frequency of this audio frame is 75 Hz, which is the same as the case of CD, the compatibility in frequency of the audio frame is generally bad with the audio pack, the video pack or the like multiplexed in the aforementioned DVD. This results in that a very complicated reproduction method is estimated to be necessary. Further, in the technical art of the DVD, the actuality is such that a person having an ordinary skill in this art does not even recognize the subject or problem itself that the compatibility in frequency of the audio frame used in the conventional CD etc. is bad with the audio pack etc. which is expected to be usable in the aforementioned DVD,

SUMMARY OF THE INVENTION

It is therefore an object of the present invention to provide an information record medium, on which the audio information, which is to be recorded, edited and reproduced by the unit of audio frame, is recorded in a form of being divided by an appropriate length and multiplexed, can be relatively easily recorded, edited and reproduced, and also provide an apparatus for recording the same, and an apparatus for reproducing the same.

The above object of the present invention can be achieved by an information record medium having a record track to be reproduced by an information reproducing apparatus, which is provided with a read device and reproduces audio information by a predetermined audio frame unit while relatively moving the read device along the record track recorded with at least the audio information by the audio frame unit. In the information record medium of the present invention, a plurality of audio packets are arranged along the record track, in each of which audio information pieces constructing the audio information sampled by a predetermined sampling frequency and audio control information for controlling a reproduction of the audio information pieces by the information reproducing apparatus are respectively recorded. The audio control information is provided with time management information for specifying a time, by a predetermined specification frequency, to manage a timing of outputting the audio information, which is included in the audio frame which head is positioned in the audio packet including the audio control information, in the reproduction by the information reproducing apparatus. And that, a frequency of the audio frame and a frequency of the audio packet are prescribed such that the frequency of the audio frame is 1/n (n: natural number) of the sampling frequency and 1/m (m: natural number) of the specification frequency, and a data amount of the audio information included in one audio packet is more than a data amount of one audio frame.

According to the information record medium of the present invention, in each of the audio packets arranged along the record the audio information pieces constructing the audio information sampled by a predetermined sampling frequency and the audio control information are respectively recorded. The audio control information is provided with time management information. The time management information specifies a time, by a predetermined specification frequency, to manage a timing of outputting the audio information, which is included in the audio frame which head is positioned in the audio packet including the pertinent audio control information, in the reproduction. At this time, since the frequency of the audio frame is 1/n of the sampling frequency, it is possible to avoid a case where the audio frame is cut in the middle of sampling. Further, since the frequency of the audio frame is 1/m of the specification frequency, the accuracy of the time specified by the time management information can be kept high. Furthermore, since the data amount of the audio information included in one audio packet is more than the data amount of one audio frame, every one of the audio packets can include the time management information respectively. As a result, such a problem is never caused that, because the time management information randomly exists or not exists in the audio packet, the recording position of the information after the time management information is shifted in a random or unknown manner. For example, it is possible to cut reading one portion of the audio control information, which is not shifted, of the bytes in the constant number in the audio packet, and to speedily read another portion of the audio control information, which is necessary for the reproduction, by use of a rather simple algorithm.

Accordingly, the construction of the information recording apparatus or the information reproducing apparatus for the DVD etc., can be simplified, and the production cost thereof can be reduced.

In one aspect of the information record medium of the present invention, the information record medium has the record track to be reproduced by the information reproducing apparatus, which reproduces video information by a predetermined video frame unit in addition to the audio information while relatively moving the read device along the record track recorded with at least the video information by the video frame unit in addition to the audio information. In this aspect, a plurality of video packets are multiplexed with the audio packets and arranged along the record track, in each of which video information pieces constructing the video information and video control information for controlling a reproduction of the video information pieces by the information reproducing apparatus are respectively recorded. And that, the frequency of the audio frame and a frequency of the video frame are prescribed such that the frequency of the audio frame is equal to an integer multiple of the frequency of the video frame.

According to this aspect, the video packets are multiplexed with the audio packets, and arranged along the record track. In each of the video packets, the video information pieces constructing the video information and the video control information are respectively recorded. At this time, since the frequency of the audio frame is equal to an integer multiple of the frequency of the video frame, it is possible to synchronize the video information and the video information. Accordingly, a complicated signal process for compensating the difference in the time between the audio information and the video information is not necessary at the time of a signal process such as a recording process, an editing process, a reproducing process and the like. Therefore, the meaning of "equal to the integer multiple of the frequency" here is that the frequencies are equal to each other in such a degree that these two kinds of audio frame and the video frame can be synchronized with each other by the actual reproducing apparatus, and that the degree of the equality thereof is determined suitably in dependence upon the ability of the reproducing apparatus and the property of the signal which are actually used.

Accordingly, the construction of the information recording apparatus or the information reproducing apparatus for the DVD etc. in which the video information as well as the audio information is dealt with, can be simplified, and the production cost thereof can be reduced.

In this aspect, there may be a plurality of different kinds of frequencies as the frequency of the video frame, and the frequency of the audio frame may be preferably prescribed to be equal to a least common multiple of the different kinds of frequencies.

According to this aspect, since the frequency of the audio frame is equal to a least common multiple of the different kinds of frequencies, the audio information and the video information can be substantially synchronized with each other, as for a plurality of different types of video information such as the information based on the NTSC method, the PAL (SECOM) method, the Hi-vision method or the like, for example, so that it is advantageous at the time of recording, editing and reproducing.

Accordingly, the construction of the information recording apparatus or the information reproducing apparatus for the DVD etc. in which the video information based on the NTSC method, the PAL method or the like, as well as the audio information is dealt with, can be simplified, and the production cost thereof can be reduced.

In another aspect of the information record medium of the present invention, the frequency of the audio frame is 600 Hz, 750 Hz, 1200 Hz, 1500 Hz, 3000 Hz or 6000 Hz.

Accord to this aspect, since the frequency of the audio frame is one of 600 Hz, 750 Hz, 1200 Hz, 1500 Hz, 3000 Hz or 6000 Hz, in case of recording the PCM linear audio data as the audio information into the audio packet, every one of the audio packets can include the time management information respectively. Further, the audio information and the video information can be synchronized with each other, as for the video information based on the NTSC method, the PAL method or the Hi-Vision method, so that it is advantageous at the time of recording, editing and reproducing.

Accordingly, the construction of the information recording apparatus or the information reproducing apparatus for the DVD etc. in which the video information based on the NTSC method, the PAL type or the like, as well as the audio information is dealt with, can be simplified, and the production cost thereof can be reduced.

The above object of the present invention can be also achieved by an information recording apparatus for recording information onto the above described information record medium of the present invention. The information recording apparatus is provided with: a record device for respectively recording, into a plurality of audio packets arranged along the record track, audio information pieces constructing the audio information sampled by a predetermined sampling frequency and audio control information for controlling a reproduction of the audio information pieces by the information reproducing apparatus, the audio control information is provided with time management information for specifying a time, by a predetermined specification frequency, to manage a timing of outputting the audio information, which is included in the audio frame which head is positioned in the audio packet including the audio control information, in the reproduction by the information reproducing apparatus; and an input device for inputting at least one portion of the audio control information. And that, a frequency of the audio frame and a frequency of the audio packet being prescribed such that the frequency of the audio frame is 1/n (n: natural number) of the sampling frequency and 1/m (m: natural number) of the specification frequency, and a data amount of the audio information included in one audio packet is more than a data amount of one audio frame.

According to the information recording apparatus of the present invention, the audio information pieces constructing the audio information sampled by a predetermined sampling frequency are respectively recorded into a plurality of audio packets arranged along the record track, by the record device. Along with this, as at least one portion of the audio control information provided with the time management information is inputted by the input device, the audio control information is recorded into each of the audio packets, by the record device. The time management information specifies a time, by a predetermined specification frequency, to manage a timing of outputting the audio information, which is included in the audio frame which head is positioned in the pertinent audio packet including the audio control information, in the reproduction. At this time, since the frequency of the audio frame is 1/n of the sampling frequency and 1/m of the specification frequency, and since the data amount of the audio information included in one audio packet is more than the data amount of one audio frame, the above described information record medium of the present invention can be recorded and obtained.

In one aspect of the information recording apparatus of the present invention, the information recording apparatus records onto the above described one aspect of the information record medium of the present invention. In this aspect, the record device respectively records, into a plurality of video packets multiplexed with the audio packets and arranged along the record track, video information pieces constructing the video information and video control information for controlling a reproduction of the video information pieces by the information reproducing apparatus. And that, the frequency of the audio frame and a frequency of the video frame are prescribed such that the frequency of the audio frame is equal to an integer multiple of the frequency of the video frame.

According to this aspect, the video information pieces constructing the video information and the video control information are respectively recorded into a plurality of video packets multiplexed with the audio packets and arranged along the record track, by the record device. AT this time, since the frequency of the audio frame is equal to an integer multiple of the frequency of the video frame, the above described one aspect of the information record medium of the present invention can be recorded and obtained.

The above object of the present invention can be also achieved by an information reproducing apparatus for reproducing information from the above described information record medium of the present invention. The information reproducing apparatus is provided with: a read device for reading information recorded at a predetermined reading position on the record track; a movement device for relatively moving the read device along the record track; an extract device for extracting the audio packet from the information read by the read device; and an audio decode device for decoding the audio information included in the extracted audio packet by the audio frame unit on the basis of the time specified by the time management information included in the extracted audio packet.

According to the information reproducing apparatus of the present invention, while the read device is relatively moved along the record track by the movement device, the information recorded at a predetermined reading position on the record track is read by the read device. Then, the audio packet is extracted from the information read by the read device, by the extract device. Finally, the audio information included in the extracted audio packet is decoded by the audio frame unit on the basis of the time specified by the time management information included in the extracted audio packet, by the audio decode device. Therefore, it is possible to easily reproduce the above described information record medium of the present invention.

In one aspect of the information reproducing apparatus of the present invention, the information reproducing apparatus reproduces the information from the above described one aspect of the information record medium of the present invention. In this aspect, the extract device extracts the audio packet and the video packet separately from the information read by the read device. And that, the information reproducing apparatus is further provided with a video decode device for decoding the video information included in the extracted video packet by the video frame unit.

According to this aspect, the audio packet and the video packet are separately extracted from the information read by the read device, by the extract device. Then, the video information included in the extracted video packet is decoded by the video frame unit, by the video decode device. Therefore, it is possible to easily reproduce the above described one aspect of the information record medium of the present invention.

In another aspect of the information reproducing apparatus of the present invention, the audio decode device decodes the audio information while cutting one portion of the audio control information other than the time management information included in the extracted audio packet.

According to this aspect, the audio information is decoded while cutting one portion of the audio control information other than the time management information included in the extracted audio packet, by the audio decode device. At this time, since every one of the audio packets includes the time management information respectively, and since the recording position of the information after the time management information is not shifted due to the existence and non-existence of the time management information, this process of cutting one portion of the audio control information can be performed by use of a relatively simple algorithm.

Accordingly, the construction of the information reproducing apparatus for the DVD etc., can be simplified, and the production cost thereof can be reduced.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 2 is a diagram showing a logical structure of the record information of the DVD in FIG. 1;

FIG. 9 is a table showing the number of quantized bits, the number of samples and the data size of data in each packet for the specification of the PCM linear audio data of FIG. 4;

FIG. 10 is a table showing a concrete data structure of the packet header of the audio pack of FIG. 8;

FIG. 11 is a table showing a concrete data structure in a private area in the packet of the audio pack of FIG. 8;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

(I) Embodiment of Information Record Medium

First of all, a physical structure and a logical structure as well as an operation of a DVD, as one embodiment of the information record medium to which the present invention is applied, will be explained with reference to FIGS. 1 to 11.

Figure 1:
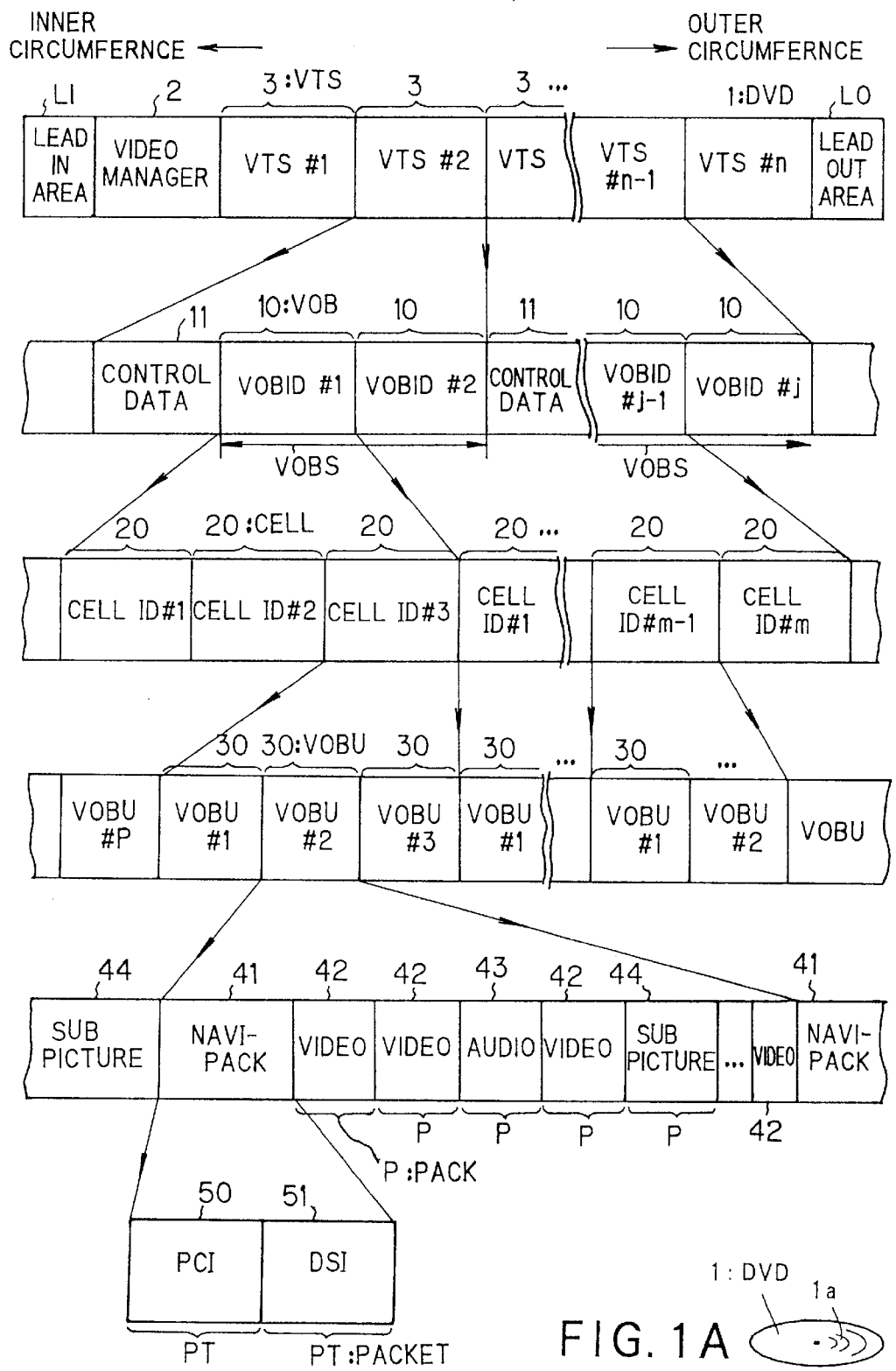
FIG. 1 is a diagram showing a physical structure of record information of a DVD as one embodiment of the present invention.

At first, a record format of video information and audio information on a record track of the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded along the record track such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for accessing each title, information for preventing an illegal copy, an access table for directly accessing each title and so on, is recorded.

Figure 1A:
FIG. 1A is a perspective view of the DVD in FIG. 1.

These video, audio and control informations are recorded on a spiral or coaxial record track 1a of the DVD 1 as shown in FIG. 1A.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41 for storing various control data; a video pack 42 for storing video data; an audio pack 43 for storing audio data; and a sub picture pack 44 for sub picture data. Here, in the video pack 42, a packet including the video data together with additional information such as header thereof is recorded. In the audio pack 43, a packet including the audio data together with additional information such as header thereof is recorded. Further, in the sub picture pack 44, a packet including graphics such as a character and a diagram as the sub picture, together with additional information such as header thereof, is recorded. In the video packs 42, which data amount is relatively large as shown in FIG. 1, one or a plurality of GOPs are recorded within one VOB unit 30. The audio pack 43 and the sub picture pack 44 are disposed intermittently between the video packs 42.

It is prescribed by a standard specification of the DVD that there are 8 kinds of audio recordable on the DVD 1 while 32 kinds of sub picture recordable on the DVD 1. Further, there always exists the navi-pack 41 in one VOBU 30. On the other hand, there may not exist each of the video pack 42, the audio pack 43 and the sub picture pack 44 in one VOBU 30, or, even in case that these packs exist in one VOBU 30, the number of the packs and the order of the packs are freely determined.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51. Further, the video data included in one VOBU 30 consist of at least one GOP (Group Of Pictures). In the PCI packet 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so-called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture pack 44 as the sub picture information.

Further, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

The MPEG 2 method used in the present embodiment employs a variable rate method, in which the data amount included in each GOP is not constant.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 2. The information is not actually recorded on the DVD 1 in the logical structure of FIG. 2. Instead, information (e.g. access information or time information) to reproduce each data shown in FIG. 1 by combining them (especially combining the cells 20) in the logical structure shown in FIG. 2, is recorded on the DVD 1, especially in the control data 11.

To make the explanation clear, the following explanation is made from the lower hierarchical layer in FIG. 2. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 2, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order of the cells 20 for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method for each PGC 61 out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 2. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 2. The title 62 included in the VTS 63 has the attributes common to each other. For example, the movies based on one movie but in different languages correspond to the respective titles 62. The information included in one VTS 63 shown in FIG. 2 corresponds to information included in one VTS 3 shown in FIG. 1. Namely, all information included in the logical VTS 63 shown in FIG. 2 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 3.

Figure 3:
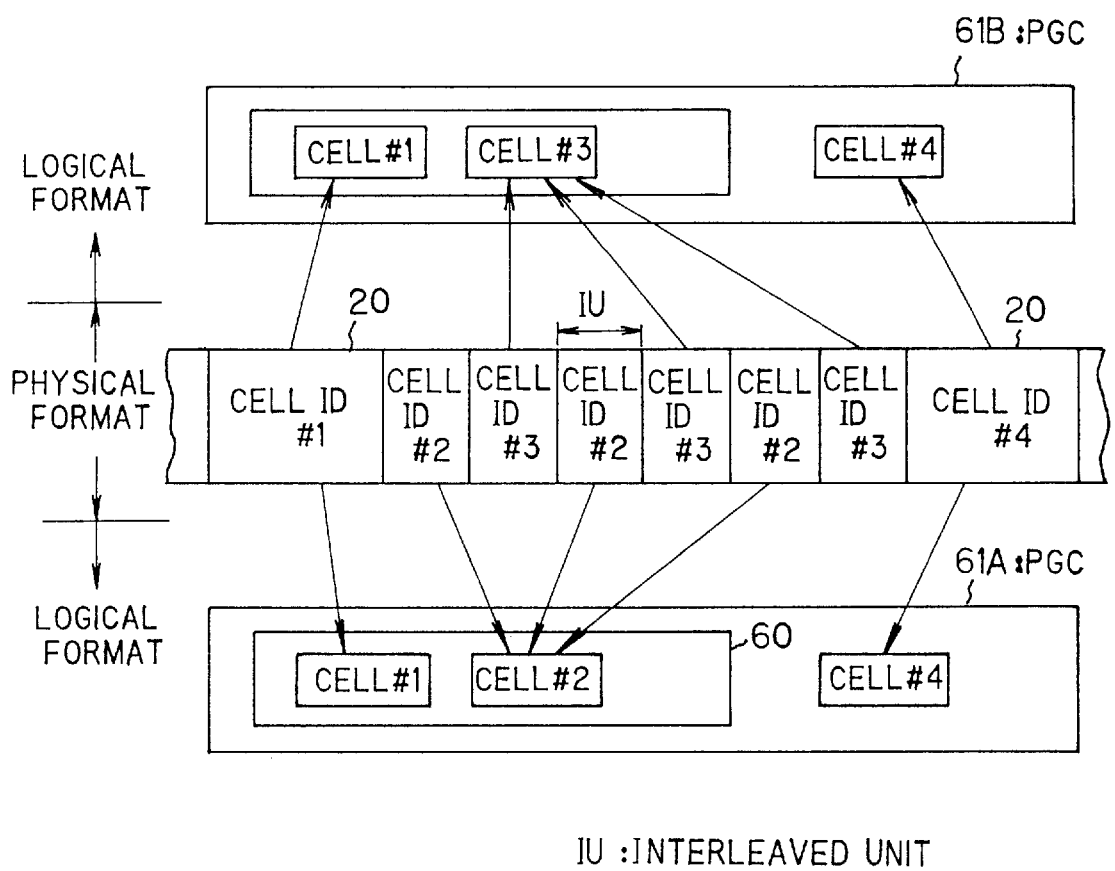
FIG. 3 is a diagram showing a structure of an interleaved unit of the DVD in FIG. 1.

Namely, as shown in FIG. 3, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 3, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at the track buffer (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Nextly, among the video information and the audio information having the above mentioned physical structure and logical structure, the audio pack 43 especially related to the present invention is explained in detail with reference to FIGS. 4 and 11.

The audio information in the DVD of the present embodiment consists of linear audio data based on the PCM (Pulse Code Modulation) method (hereinbelow, it is referred to as "PCM linear audio data") having the specification as listed below, for example.

Sampling frequency: 48 kHz or 96 kHz
the number of quantized bits: 16 bits, 20 bits or 24 bits
channel number: 1 ch to 8 ch As a combination of the parameters in this specification, for example, if the combination of 96 kHz, 24 bits and 8 ch is considered, the data rate of the PCM linear audio data becomes 18.432 MHz (Mega Hz). In order to perform the reproduction by this data rate, a significantly high operation rate or speed is required to the reproducing apparatus and the electric power consumption accompanying the rotation number of the disk is also significantly large. Therefore, in the DVD 1 of the present embodiment, with considering these operation rate and electric power consumption of the hardware of the reproducing apparatus, the upper limit of the data rate of the audio data is set to 6.144 MHz. Thus, in the DVD 1 of the present embodiment explained hereinbelow, the PCM linear audio data is dealt with, which specification is as shown in a table of FIG. 4. In the table of FIG. 4, the expression of "48k/98k" in a column of the sampling frequency indicates that either one of 48 kHz and 96 kHz is available (the same thing can be said for the rest), while the expression of "16, 20, 24" in the column of the number of quantized bits indicates that either one of 16 bits, 20 bits and 24 bits is available (the same thing can be said for the rest).

Figures 4, 5:
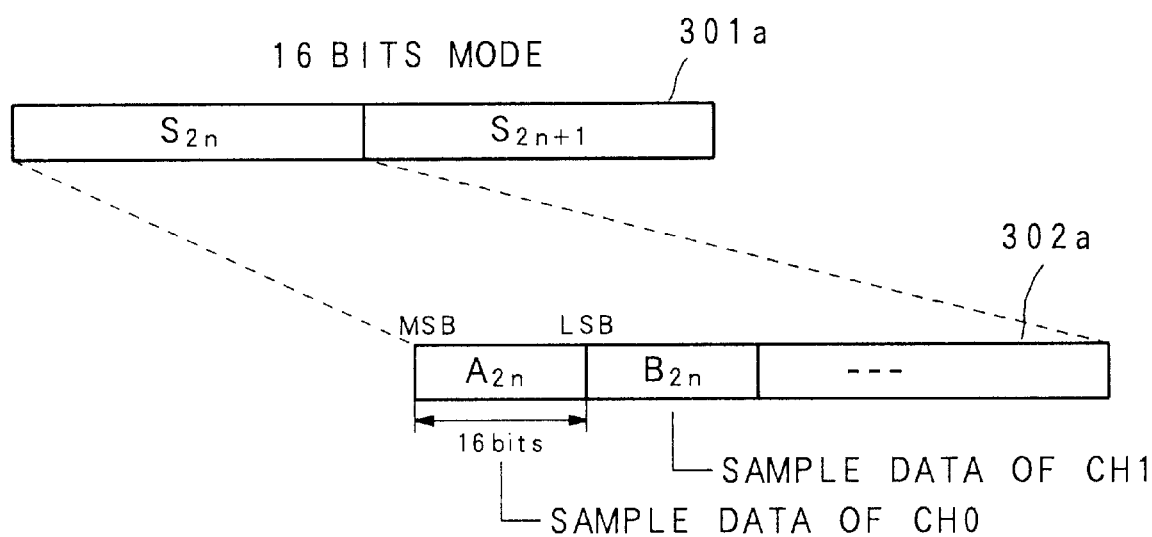
FIG. 4 is a table showing the specification of PCM linear audio data recorded on the DVD of FIG. 1.
FIG. 5 is a diagram showing one example of the arrangement of sample data in the PCM linear audio data of FIG. 4.
Figure 6:
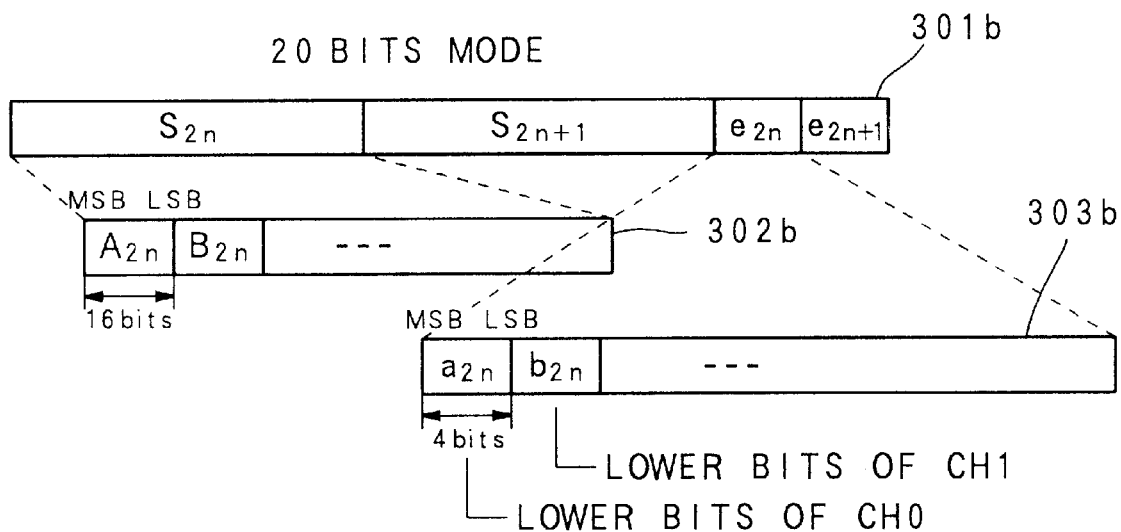
FIG. 6 is a diagram showing another example of the arrangement of sample data in the PCM linear audio data of FIG. 4.
Figure 7:
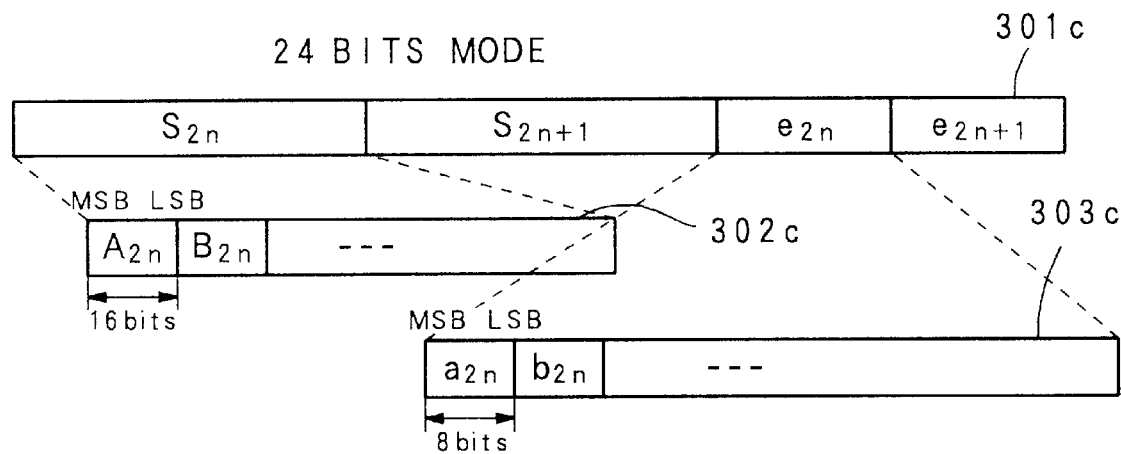
FIG. 7 is a diagram showing another example of the arrangement of sample data in the PCM linear audio data of FIG. 4.

Here, some examples of the arrangement of the PCM linear audio data are shown in FIGS. 5 to 7, respectively.

FIG. 5 shows the arrangement of sample data 301a in the 16 bits mode, FIG. 6 shows the arrangement of sample data 301b in the 20 bits mode, and FIG. 7 shows the arrangement of sample data 301c in the 24 bits mode.

In FIG. 5, sample data S2n and Sn+1 respectively indicate the sample data, which sample order is 2n, and the sample data, which sample order is 2n+1 (n=0, 1, 2, . . . , and so forth on). Namely, each of data portions A2n, B2n, . . . constructing sample data 302a in the figure indicates 16 bits of respective one of the channels.

In FIG. 6, sample data S2n and S2n+1 respectively indicate upper 16 bits of the sample data, which sample order is 2n, and upper 16 bits of the sample data, which sample order is 2n+1. Sample data e2n and e2n+1 respectively indicate lower 4 bits of the sample data, which sample order is 2n, and lower 4 bits of the sample data, which sample order is 2n+1. Namely, each of data portions A2n, B2n, . . . constructing sample data 302b in the figure indicates the upper 16 bits of respective one of the channels, while each of data portions a2n, b2n, . . . constructing sample data 303b in the figure indicates the lower 4 bits of respective one of the channels.

In FIG. 7, sample data S2n and S2n+1 respectively indicate upper 16 bits of the sample data, which sample order is 2n, and upper 16 bits of the sample data, which sample order is 2n+1. Sample data e2n and e2n+1 respectively indicate lower 8 bits of the sample data, which sample order is 2n, and lower 8 bits of the sample data, which sample order is 2n+1. Namely, each of data portions A2n, B2n, . . . constructing the sample data 302c in the figure indicates the upper 16 bits of respective one of the channels, while each of data portions a2n, b2n, . . . constructing the sample data 303c in the figure indicates the lower 8 bits of respective one of the channels.

Either one of the data 301a, the data 301b and the data 301c of respective modes shown in FIG. 5 to FIG. 7 is treated as one unit for every 2 samples corresponding to the number of channels.

The PCM linear audio data having the above explained specification is modified or arranged into the MPEG 2 system stream in accordance with the ISO/IEC13818-1 standard. Namely, according to this standard, the PCM linear audio data is divided into data pieces each having such a length able to be stored in one audio pack 43 shown in FIG. 1, and the divided data pieces are stored (recorded) in respective audio packs 43.

Figure 8:
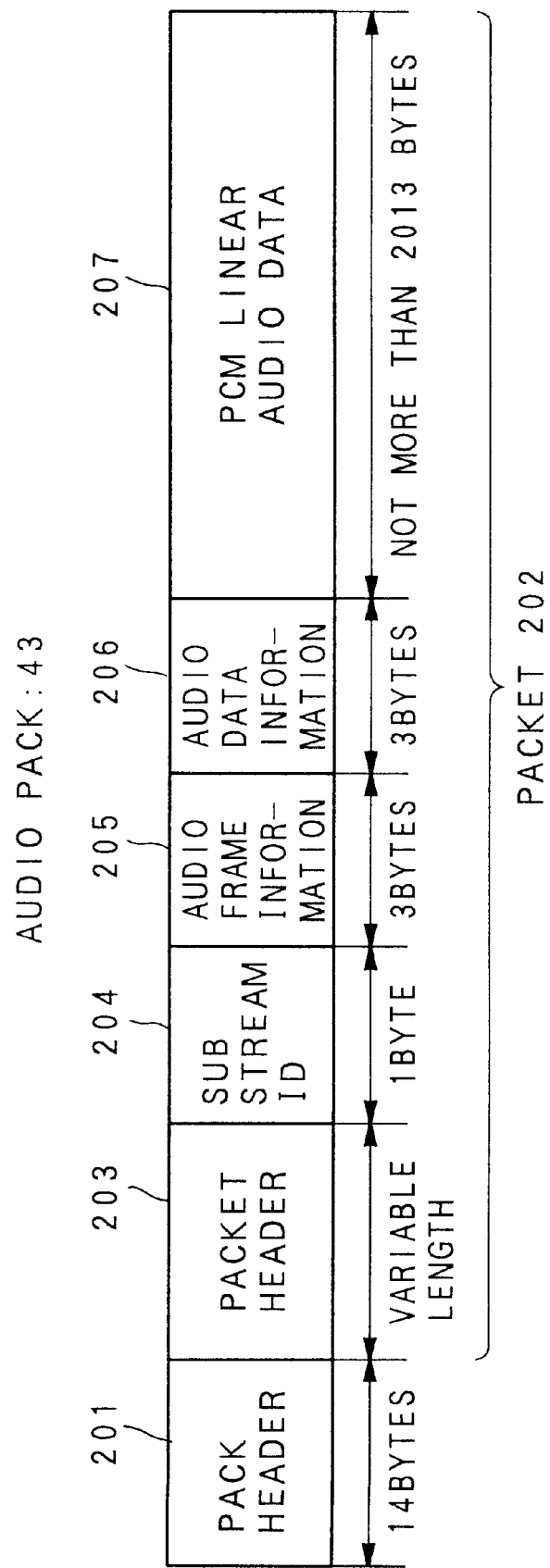
FIG. 8 is a diagram showing a physical data structure of the audio pack on the DVD of FIG. 1.

In this case, one audio pack 43 has a size of not more than 2048 bytes, for example, as shown in FIG. 8, and has one packet in one pack. More concretely, in FIG. 8, the audio pack 43 has: a pack header 201 of 14 bytes, which indicates the attribute information as for the whole of the pertinent audio pack, e.g., information indicating that the PCM linear audio data in the pertinent audio pack is based on the MPEG 2 system stream standard; and a packet 202 of 2034 bytes, in which the substantial PCM linear audio data is stored.

Then, the packet 202 is provided with: a packet header 203 indicating the attribute information as for the whole of the pertinent packet; a sub stream ID; audio frame information 205; audio data information 206; and the PCM linear audio data 207 of 2013 bytes, which is the substantial audio data pieces.

The maximum number of the audio samples, which can be stored in each audio pack 43 (packet 202) constructed in the above mentioned manner, is indicated in a table of FIG. 9, as for respective combinations shown in FIG. 4. As understood from the table of FIG. 9, since the number of the audio samples is treated in the unit of 2 samples (refer to FIGS. 5 to 7), the maximum number of the samples able to be stored in one packet 202 is always even.

Nextly, the data structure of the packet header 203 is explained in more detail with reference to FIG. 10.

In FIG. 10, the packet header 203 is provided with: a packet start code field 203a of 3 bytes indicating the start position of the pertinent packet; a stream ID field 203b indicating that the audio data is based on the standard of the private stream 1; and a packet length field 203c indicating the length of the pertinent packet.

The packet header 203 especially includes a PTS (Presentation Time Stamp i.e. time management information for the reproduction output) field 203f, to which the PTS indicating the time to manage the timing of the reproduction output set to synchronize each audio stream is written. This PTS field 203f is added to the packet header 203 only if the head of the audio frame is located in the pertinent packet 202. On the contrary, if the head of the audio frame is not located in the pertinent packet 202, the PTS field 203f is not added, and that the space for this PTS field 203f is packed by the subsequent data as forward packing. Therefore, the number of bytes of this packet header 203 is variable depending upon the existence and non-existence of the PTS 203f. Further, if there are two heads of the audio frames are located in one packet 202, only the PTS corresponding to the first audio frame among these is added to the packet header 203. The PTS indicates the time, at which the head byte of the audio frame appeared in the pertinent packet is to be outputted from the decoder. The PTS is specified by a unit of 90 kHz and by a length of 33 bits. The reason for adopting 90 kHz here is that it is a value of the common multiple of the frequencies of audio frames such as the NTSC (National Television System Committee) method, the PAL (Phase Alternation Line) method and the like. The reason for adopting 33 bits here is to express the time in the range of 24 hours in one day by the measurement of the 90 kHz clock.

The packet header 203 is further provided with: a PTS and DTS flag field 203d, which indicates a PTS flag indicating whether or not the PTS is added in the pertinent packet header 203; a field 203e indicating the data length of the header; a field 203g indicating the buffer scale which is required for the reproduction; and a field 203h indicating the buffer size.

Finally, the packet header 203 is provided with a stuffing bytes field 203i of variable length from 1 to 7 bytes, such that the stuffing byte or bytes are stuffed (packed) so as to make the byte length of the pertinent audio pack 43 be equal to a predetermined byte length, which is not longer than 2048 bytes, as the occasion demands. Each stuffing byte has a special value such as "FFh", for example, so that it is easy to cut reading this field 203i by recognizing the pattern of the stuffing byte.

Nextly, the data structures of the sub stream ID 204, the audio frame information 205 and the audio data information 206, which are positioned next to the packet header 203 in the private data area of the packet 202 shown in FIG. 8, are explained in more detail with reference to FIG. 11.

In FIG. 11, in the private data area of the packet 202, there are provided with: the sub stream ID 204 of 1 byte, which indicates that the audio data in the pertinent packet is the PCM linear audio data recorded under the standard of the private stream 1; the audio frame information 205 of 3 bytes, which includes information indicating the number of frame boundaries (i.e. the number of frame headers) within the pertinent packet, and a pointer indicating the position of a first access unit; the audio data information 206 of 3 bytes indicating various parameters related to the linear audio such as an audio emphasis flag, an audio mute flag, an audio frame number which boundary is firstly appeared in the pertinent packet, the number of quantized bits, a sampling frequency, a number of channels and a dynamic range; and the PCM linear audio data 207 of 2013 bytes at the maximum, as the substantial audio data pieces.

As described above, the area, where the PCM linear audio data can be stored in one audio pack 43, is 2013 bytes at the maximum.

In the present embodiment, the frequency of the audio frame is set especially to satisfy three conditions as listed below.

Condition [C1] It is 1/n (n: natural number) of 48 kHz and 96 kHz, which are the sampling frequencies.

Condition [C2] It is 1/n (n: natural number) of 90 kHz, which is the frequency used for specifying the PTS.

Condition [C3] It is higher than 387 Hz, which is the highest frequency of the audio pack 43 under the specification shown in the table of FIG. 4.

The above mentioned condition [C1] is a condition not to discontinue the audio frame while sampling. The above mentioned condition [C2] is a condition not to degrade the accuracy of the PTS. The above mentioned condition [C3] is a condition to add the PTS into the packet 202 as for all of the audio packs 43. The "highest frequency" mentioned in the condition [C3] is a frequency in case of the combination of 48 kHz, 8 ch and 16 bits as the specification of the audio data, in which the maximum number of the samples in the packet is the minimum (124 samples) in the table of FIG. 9, and is obtained by $1/\{124\times(1/48 \text{ kHz})\}=387$ Hz.

At first, from the conditions [C1] and [C2], the frequency of the audio frame must be 1/n (n: natural number) of 6000, which is the greatest common divisor of 48000 and 90000. Then, with considering the condition [C3] in addition, the frequency of the audio frame to be obtained in this case is either one of 600 Hz, 750 Hz, 1200 Hz, 1500 Hz, 3000 Hz and 6000 Hz.

Here, since the number of bits of an audio frame counter required for the reproducing apparatus is increased in proportional to the frequency of the audio frame, the treatment of the audio data becomes more difficult or troublesome as the frequency gets higher. From this point of view, the desirable frequency among the above obtained audio frequencies is 600 Hz, which is the lowest frequency among those. At this time, the reproduction time period of one audio frame is 1/600 Hz≈1.67 ms, so that a relatively simple reproduction is possible.

In this manner, according to the present embodiment, since the frequency of the audio frame is prescribed to be 600 Hz etc., and since the highest frequency of the audio pack 43 corresponding to the table shown in FIG. 4 is 387 Hz, the PTS is always added to any one of the packet headers 203. In this way, since the PTS is always added to any one of the packet headers 203, the aforementioned PTS flag is always set to ON, so that the PTS flag in the present embodiment is for the confirmation purpose only, and there is no essential problem even if this PTS flag is not added thereto.

As a result of the above, according to the present embodiment, since the PTS is always added to any one of the packet headers 203 which are included in respective audio packs 43, such a problem is never caused that, because the PTS randomly exists or not exists in the packet headers 203, the position of the data after the PTS is shifted one by one in a random or unknown manner. Thus, it is possible to cut reading the data of the bytes in the constant number (e.g. 17 bytes from the head of the packet header) in the packet data 203 shown in FIG. 10, and to read the stream ID 204, the audio frame information 205 and the audio data information 206 shown in FIG. 11 which are mainly required for reproducing the PCM linear audio data, after reading the stuffing bytes 203i in the predetermined number of bytes, which reading can be easily cut by the aforementioned pattern recognition, by use of a rather simple algorithm, while reducing the cost of the reproducing apparatus and simplifying the reproducing apparatus.

This advantage of the present embodiment is evaluated by assuming a case where the frequency of the audio pack 43 is 387 Hz and that the frequency of the audio frame is 75 kHz in the same manner as the aforementioned conventional CD. In this case, since 387 Hz/75 Hz=5.16, the boundary (i.e. the head) of the audio frame appears once every 5 to 6 audio packs. Namely, the PTS is added to the audio pack once every 5 to 6 audio packs. As a result, such a situation is caused that the PTS randomly exists and not exists in the respective packet headers of the audio packs, so that the position of the data after the PTS is shifted one by one in a random or unknown manner, which is a problem. In this case, although it is possible to judge the existence and non-existence of the PTS by referring to the aforementioned PTS flag provided in the packet header, a very complicated algorithm is necessary in the reproducing apparatus in any event, in order to cut reading the data of the bytes in the constant number as aforementioned.

As described above, the present embodiment is quite advantageous as compared with the comparison example in which the frequency of the audio frame same as the case of the conventional CD is used for the DVD in the present embodiment.

In the present embodiment, the video data stored in the video pack 42 in FIG. 1 is based on one of the NTSC method, PAL method and the Hi-Vision method.

The frequencies of the video frames based on these methods are as listed below.

NTSC: 29.97 (=30/1.001) Hz

PAL (SECOM): 25 Hz

Hi-Vision: 30 Hz

Here, it is preferable in the present embodiment that the frequency of the audio frame satisfies a condition [C4] as following in addition to the aforementioned conditions [C1] to [C3].

Condition [C4] It is a frequency equal to the integer multiple of the least common multiple of the frequencies of the existing video frames of various kinds.

In this condition [C4], the "least common multiple" is 30000, which is the least common multiple of 29.97, 25 and 30. Thus, the integer multiple of this least common multiple cannot satisfy the aforementioned conditions [C1] and [2]. Therefore, as a second best stringer, with considering the fact that 29.97 and 30 are different from each other by only about 0.001%, the frequency which is the integer multiple of 150, which is the least common multiple of 30 and 25, is treated as the frequency "equal to the integer multiple of the least common multiple" in the condition [C4].

Here, either one of the aforementioned audio frequencies 600 Hz, 750 Hz, 1200 Hz, 1500 Hz, 3000 Hz and 6000 Hz obtained by the conditions [C1] to [C3], satisfies this condition [C4].

As a result, in the present embodiment, the compatibility or congeniality in the frequency between the audio frame and the video frame is excellent. Especially in case of the PAL (SECOM) or the Hi-Vision, the video frames are perfectly synchronized with the audio frames. In case of the NTSC, the video frames are almost synchronized with the audio frames. For this reason, with respect to the data arrangement in the physical data structure shown in FIG. 1, it is possible to make the audio information in the data amount of one audio frame and the video information in the data amount of one video frame correspond to the time period almost coincident to each other. Consequently, a complicated signal process for compensating the difference in the reproduction time between the audio information and the video information at the time of recording, editing and reproducing is not necessary, which is another advantage of the present embodiment. In this manner, the present embodiment is quite advantageous as compared with a comparison case, where 75 Hz is employed as the frequency of the audio frame same as the conventional CD, and the synchronization of the audio data with the video data based on the NTSC method or the Hi-Vision method, except for the PAL (SECOM) method, cannot be achieved at all, so that the complicated signal process is required.

Since the DVD has such a large memory capacity that, in addition to one movie, the audio voices and captions (titles) in a plurality of kinds of languages corresponding to this one movie can be recorded on a single optical disk, it is effective to apply the above described record format especially to the DVD 1.

(II) Embodiment of Recording Apparatus

Next, an embodiment of recording apparatus for recording the above mentioned control information, video information and audio information onto the DVD 1 will be explained with reference to FIG. 12.

At first, a construction and an operation of the recording apparatus as the embodiment is explained with reference to FIG. 12.

Figure 12:
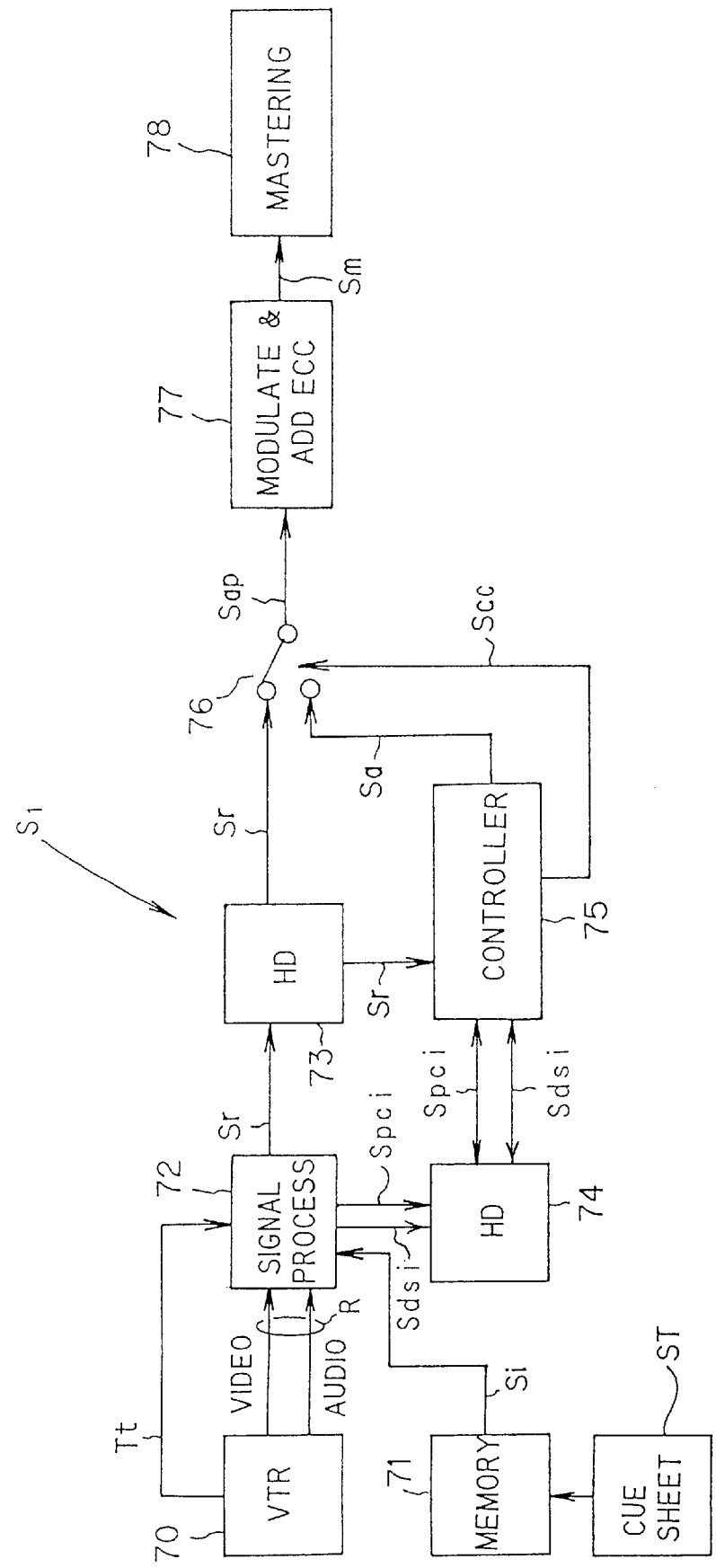
FIG. 12 is a block diagram of an information recording apparatus for recording the DVD in FIG. 1, as another embodiment of the present invention.

As shown in FIG. 12, a recording apparatus S1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. to be recorded on the DVD 1, is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process and a signal compressing process to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record information Pr in advance, and temporarily stores content information related to the partial record information Pr which is inputted beforehand on the basis of a cue sheet ST, on which the user defined information such as the packet header, the sub stream ID, the audio frame information, the audio data information and so on shown in FIGS. 10 and 11, are written. Then, the memory 71 outputs it as a content information signal S1 on the basis of a request from the signal process unit 72.

Then, the signal process unit 72 generates and outputs a PCI information signal Spci and a DSI information signal Sdsi corresponding to the partial record information Pr with referring to a time code Tt, on the basis of the time code Tt corresponding to the record information R outputted from the VTR 70 and the content information signal Si outputted from the memory 71. Then, the PCI information signal Spci and the DSI information signal Sdsi are temporarily stored in the hard disk device 74.

The above described processes are performed with respect to the whole record information R.

When the above described processes are finished as for the whole record information R, the controller 75 reads out the compressed multiplexed signal Sr from the hard disk device 73, reads out the PCI data signal Spci and the DSI data signal Sdsi as well as other control informations from the hard disk device 74, generates additional information DA, which includes independently each of the PCI data 50, the DSI data 51 and the other control informations, on the basis of these read out signals, and temporarily stores the additional information DA into the hard disk device 74. This is because there may be control information, which content is determined in dependence upon a generation result of the compressed multiplexed signal Sr among various control informations.

On the other hand, the controller 75 performs a time management for each of the operations of the signal process unit 72, the hard disk device 73 and the hard disk device 74, and reads out the additional information DA, which includes the PCI information signal Spci and the DSI information signal Sdsi, from the hard disk device 74, so that the controller 75 generates and outputs an additional information signal Sa corresponding to the read out additional information DA, and generates and outputs an information selection signal Scc to time-axis-multiplex the compressed multiplexed signal Sr and the additional information signal Sa.

After that, the compressed multiplexed signal Sr and the additional information signal Sa are time-axis-multiplexed by the multiplexer 76 to be outputted as an information added compressed multiplexed Sap. If there exists the sub picture information to be recorded, it is inputted, by other means such as a hard disk device not illustrated, to the signal process unit 72, so that it is processed in the same manner as the video and audio information thereat.

Then, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

Nextly, the processes of recording the audio information and the video information into the audio pack and the video pack respectively related to the present embodiment are explained in more detail.

In the above explained recording processes, the signal process unit 72 especially performs a process of dividing and compressing the video information, and stores (packs) the divided and compressed video information into the video pack 42 shown in FIG. 1. The signal process unit 72 also performs a process of dividing the audio information and arranging the divided audio information to a predetermined sample data arrangement, and stores (packs) the divided and arranged audio information into the audio pack 43 shown in FIGS. 1 and 8. Then, the signal process unit 72 time-axis-multiplexes these video pack 42 and the audio pack 44, and outputs the multiplexed packs as the compressed multiplexed signal Sr.

At this time, the audio information stored or packed in the audio pack 43 is the aforementioned PCM linear audio data as shown in the table of FIG. 4. And that, the frequency of the audio frame thereof is either one of 600 Hz, 750 Hz, 1200 Hz, 1500 Hz, 3000 Hz and 6000 Hz, while the frequency of the audio pack 43 is 387 Hz at the maximum.

As a result of the above, in the DVD recorded by the information recording apparatus S1, the PTS is always added to any one of the aforementioned packet headers. Therefore, in the information reproducing apparatus for reproducing this DVD, it is possible to cut reading the data of the bytes in the constant number in the packet header, and to read the stream ID, the audio frame information and the audio data information which are mainly required for reproducing the PCM linear audio data, by use of a rather simple algorithm, while simplifying the construction of the information reproducing apparatus. On the contrary, on the side of the information recording apparatus S2, since the PTS is always added to each of the packet headers, it is not necessary to perform a complicated process e.g. a process of forward packing the subsequent data of the possibly existing PTS in dependence upon the existence and non-existence of the PTS, and it is further possible to simplify the process of adding the PTS flag, which is always set to ON. Furthermore, the video information stored or packed in the video pack 42 by the signal process unit 72 is the video data based on either one of the NTSC, PAL and Hi-Vision methods as aforementioned.

As a result, in the DVD recorded by the information recording apparatus S1, the compatibility or congeniality in the frequency between the audio frame and the video frame is excellent. Thus, a complicated signal process for compensating the difference in the reproduction time between the audio information and the video information is not necessary on the side of the information recording apparatus S1 as well as on the side of the information reproducing apparatus, which is another advantage of the present embodiment.

(III) Embodiment of Reproducing Apparatus

Next, an embodiment of reproducing apparatus for reproducing the information recorded on the DVD 1 by the above mentioned recording apparatus S1 will be explained with reference to FIG. 13.

At first, a construction and an operation of the reproducing apparatus as the embodiment is explained with reference to FIG. 13.

Figure 13:
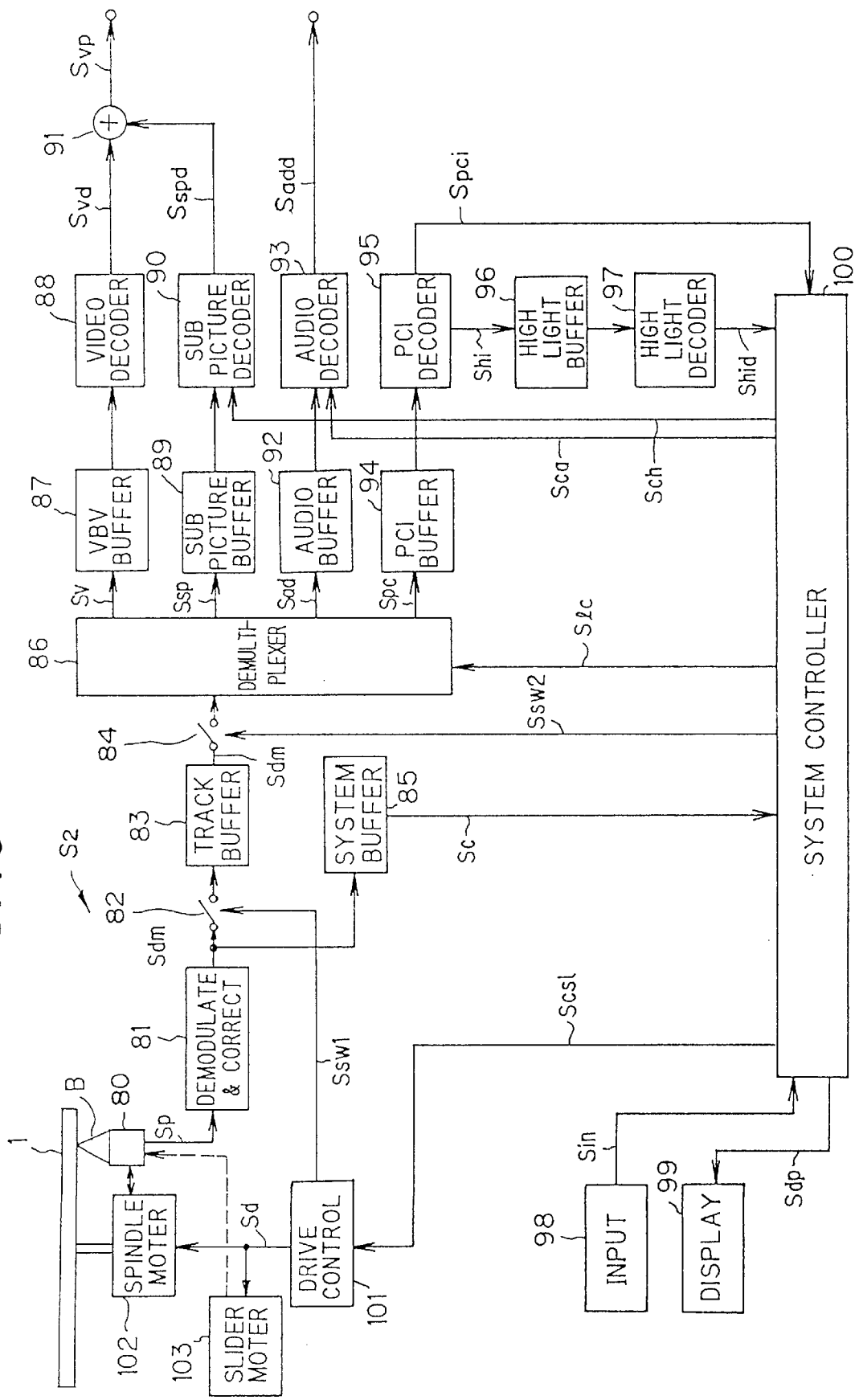
FIG. 13 is a block diagram of an information reproducing apparatus for reproducing the DVD in FIG. 1, as another embodiment of the present invention.

As shown in FIG. 13, a reproducing apparatus S2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 13 only illustrates the portions related to the video and audio reproduction of the reproducing apparatus S2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. Then it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the IPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the management information (e.g. the video manager 2), the control data 11 of the VTS 3 and the like (refer to FIG. 1) which are detected firstly upon loading the DVD 1 and which are related to the whole information recorded on the DVD 1. Then, the system buffer 85 outputs the accumulated data as a control information Sc to the system controller 100, and temporarily stores the DSI packet 51 for each navi-pack 41 (refer to FIG. 1) as the occasion demands while reproducing the information, to output it also as the control information Sc.

The demultiplexer 86, to which the demodulation signal Sdm is continuously inputted through the stream switch 84, separates the video information, the audio information, the sub picture information and the PCI packet 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. The demultiplexer 86 sends the packet header etc. of each packet as the control signal Sdmx to the system controller 100. There may be a case where, in the demodulation signal Sdm, different streams of the audio information or the sub picture information in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the IPEG 2 method. Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, and it is outputted as a decoded audio signal Sadd to a speaker etc. not illustrated. If it is detected by the system controller 100 that it is necessary to temporarily stop (pause) the audio voice in the reproduction immediately after accessing, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI packet 50, which is included in the PCI signal Spc, with the video information, the audio information and the sub picture information corresponding to the PCI packet 50, and apply the PCI packet 50 to the video information and the like. Then, from the PCI signal Spc, which is synchronized with the corresponding the video information and the like by the PCI buffer 94, a high light information included in the PCI packet 50 is separated or extracted by the PCI decoder 95, and is outputted as a high light signal Shi to the high light buffer 96. The portion of the PCI packet 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. Here, the system controller 100 outputs the aforementioned high light control signal Sch to change the display condition by the high light information, on the basis of the decoded high light signal Shid.

On the basis of the control information Sc inputted from the system buffer 85, the control signal Sdmx inputted from the demultiplexer 86, the PCI information signal Spci inputted from the PCI decoder 95 and an input signal Sin inputted from the input unit 98 such as a remote controller, the system controller 100 outputs the aforementioned switch signal Ssw2, the language selection signal S1c, the pause signal Sca and the high light control signal Sch to correctly perform the reproduction corresponding to those input signals, and also outputs a display signal Sdp to display an operation condition etc. of the reproducing apparatus S2 to the display unit 99 such as the liquid crystal device.

Further, the system controller 100 outputs a seamless control signal Scs1 corresponding to the track jump process such as a search process etc., to the drive controller 101, when it detects by the control signal Sc or the aforementioned DSI data etc. that it is necessary to perform the track jump process such as a search in order to perform the seamless reproduction.

Then, the drive controller 101, to which the seamless control signal Scs1 is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 13), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Nextly, the process of reproducing the audio information and the video information respectively stored or packed in the audio pack and the video pack especially related to the present embodiment is explained in more detail.

In the above explained reproducing processes, the demultiplexer 86 outputs the video signal Sv, as the video information stored or packed in the video pack 42 divided as shown in FIG. 1, to the VBV buffer 87, and outputs the audio signal Sad, as the audio information stored or packed in the audio pack 44 divided as shown in FIG. 1, to the audio buffer 92.

At this time, the audio information stored or packed in the audio pack 43 is the aforementioned PCM linear audio data as shown in the table of FIG. 4. And that, the frequency of the audio frame thereof is either one of 600 Hz, 750 Hz, 1200 Hz, 1500 Hz, 3000 Hz and 6000 Hz, while the frequency of the audio pack 43 is 387 Hz at the maximum. Further, the video information stored or packed in the video pack 42 is the video data based on either one of the NTSC, PAL and Hi-Vision methods as aforementioned.

Accordingly, the compatibility or congeniality in the frequency between the audio frame of the audio signal Sad and the video frame of the video signal Sv sequentially outputted from the demultiplexer 86 is excellent. Therefore, the aforementioned process of outputting the audio signal Sad in synchronization with the video signal Sv including the corresponding video information, by the audio buffer 92, is quite simple.

Further, the PTS is always added to each of the aforementioned packet headers in the audio signal Sad inputted to the audio decoder 93. As a result, in the audio decoder 93, it is possible to cut reading the data of the bytes in the constant number in the packet header (e.g. 17 bytes from the head of the packet header), and to read the stream ID, the audio frame information and the audio data information which are mainly required for reproducing the PCM linear audio data after reading the stuffing bytes 203i in the predetermined number of bytes, which reading can be easily cut by the aforementioned pattern recognition, by use of a rather simple algorithm.

As described above in detail, according to the present embodiment, the hardware construction as well as the algorithm as for the audio buffer 92, the audio decoder 93 and the like can be simplified.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information record medium having a record track to be reproduced by an information reproducing apparatus, which comprises a read means and reproduces audio information by a predetermined audio frame unit while relatively moving said read means along said record track recorded with at least said audio information by said audio frame unit, wherein:

a plurality of audio packets are arranged along said record track, in each of which audio information pieces constructing said audio information sampled by a predetermined sampling frequency and audio control information for controlling a reproduction of said audio information pieces by said information reproducing apparatus are respectively recorded;

said audio control information comprises time management information for specifying a time, by a predetermined specification frequency, to manage a timing of outputting said audio information, which is included in said audio frame which head is positioned in said audio packet including said audio control information, in the reproduction by said information reproducing apparatus; and a frequency of said audio frame and a frequency of said audio packet are prescribed such that the frequency of said audio frame is 1/n (n: natural number) of said sampling frequency and 1/m (m: natural number) of said specification frequency, and a data amount of said audio information included in one audio packet is more than a data amount of one audio frame.

2. An information record medium according to claim 1, having said record track to be reproduced by said information reproducing apparatus, which reproduces video information by a predetermined video frame unit in addition to said audio information while relatively moving said read means along said record track recorded with at least said video information by said video frame unit in addition to said audio information, wherein:

a plurality of video packets are multiplexed with said audio packets and arranged along said record track, in each of which video information pieces constructing said video information and video control information for controlling a reproduction of said video information pieces by said information reproducing apparatus are respectively recorded; and the frequency of said audio frame and a frequency of said video frame are prescribed such that the frequency of said audio frame is equal to an integer multiple of the frequency of said video frame.

3. An information record medium according to claim 2, wherein there are a plurality of different kinds of frequencies as the frequency of said video frame, and the frequency of said audio frame is prescribed to be equal to a least common multiple of said different kinds of frequencies.

4. An information record medium according to claim 1, wherein the frequency of said audio frame is one selected from a group consisting of 600 Hz, 750 Hz, 1200 Hz, 1500 Hz, 3000 Hz and 6000 Hz.

5. An information recording apparatus for recording information onto an information record medium having a record track to be reproduced by an information reproducing apparatus, which comprises a read means and reproduces audio information by a predetermined audio frame unit while relatively moving said read means along said record track recorded with at least said audio information by said audio frame unit, said information recording apparatus comprising:

a record means for respectively recording, into a plurality of audio packets arranged along said record track, audio information pieces constructing said audio information sampled by a predetermined sampling frequency and audio control information for controlling a reproduction of said audio information pieces by said information reproducing apparatus, said audio control information comprising time management information for specifying a time, by a predetermined specification frequency, to manage a timing of outputting said audio information, which is included in said audio frame which head is positioned in said audio packet including said audio control information, in the reproduction by said information reproducing apparatus; and an input means for inputting at least one portion of said audio control information, a frequency of said audio frame and a frequency of said audio packet being prescribed such that the frequency of said audio frame is 1/n (n: natural number) of said sampling frequency and 1/m (m: natural number) of said specification frequency, and a data amount of said audio information included in one audio packet is more than a data amount of one audio frame.

6. An information recording apparatus according to claim 5, for recording onto said information record medium having said record track to be reproduced by said information reproducing apparatus, which reproduces video information by a predetermined video frame unit in addition to said audio information while relatively moving said read means along said record track recorded with at least said video information by said video frame unit in addition to said audio information, wherein:

said record means respectively records, into a plurality of video packets multiplexed with said audio packets and arranged along said record track, video information pieces constructing said video information and video control information for controlling a reproduction of said video information pieces by said information reproducing apparatus; and the frequency of said audio frame and a frequency of said video frame are prescribed such that the frequency of said audio frame is equal to an integer multiple of the frequency of said video frame.

7. An information reproducing apparatus for reproducing information from an information record medium having a record track recorded with at least audio information by a predetermined audio frame unit, wherein: a plurality of audio packets are arranged along said record track, in each of which audio information pieces constructing said audio information sampled by a predetermined sampling frequency and audio control information for controlling a reproduction of said audio information pieces are respectively recorded; said audio control information comprises time management information for specifying a time, by a predetermined specification frequency, to manage a timing of outputting said audio information, which is included in said audio frame which head is positioned in said audio packet including said audio control information, in the reproduction; and a frequency of said audio frame and a frequency of said audio packet are prescribed such that the frequency of said audio frame is 1/n (n: natural number) of said sampling frequency and 1/m (m: natural number) of said specification frequency, and a data amount of said audio information included in one audio packet is more than a data amount of one audio frame, said information reproducing apparatus comprising:

a read means for reading information recorded at a predetermined reading position on said record track;

a movement means for relatively moving said read means along said record track;

an extract means for extracting said audio packet from the information read by said read means; and an audio decode means for decoding said audio information included in said extracted audio packet by said audio frame unit on the basis of the time specified by said time management information included in said extracted audio packet.

8. An information reproducing apparatus according to claim 7, for reproducing the information from said information record medium having said record track recorded with at least video information by a predetermined video frame unit in addition to said audio information, wherein: a plurality of video packets are multiplexed with said audio packets and arranged along said record track, in each of which video information pieces constructing said video information and video control information for controlling a reproduction of said video information pieces are respectively recorded; and the frequency of said audio frame and a frequency of said video frame are prescribed such that the frequency of said audio frame is equal to an integer multiple of the frequency of said video frame, wherein:

said extract means extracts said audio packet and said video packet separately from the information read by said read means; and said information reproducing apparatus further comprises a video decode means for decoding said video information included in said extracted video packet by said video frame unit.

9. An information reproducing apparatus according to claim 7, wherein said audio decode means decodes said audio information while cutting one portion of said audio control information other than said time management information included in said extracted audio packet.

* * * * *